(12) United States Patent
Yoshizawa et al.

(10) Patent No.: US 6,401,490 B1
(45) Date of Patent: *Jun. 11, 2002

(54) METHOD FOR MANUFACTURING TEMPERED GLASS SHEET AND APPARATUS FOR MANUFACTURING THE SAME

(75) Inventors: Hideo Yoshizawa; Toru Futagami; Norihiro Fujioka, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/442,224

(22) Filed: Nov. 17, 1999

Related U.S. Application Data

(62) Division of application No. 09/089,470, filed on Jun. 2, 1998, now Pat. No. 6,032,489.

(30) Foreign Application Priority Data

Jun. 5, 1997 (JP) ............................................. 9-147437

(51) Int. Cl.[7] ......................... C03B 27/00; C03B 27/048
(52) U.S. Cl. ............................ 65/25.4; 65/25.2; 65/95; 65/104; 65/107; 65/114; 65/182.2; 65/348; 65/349; 65/351
(58) Field of Search ...................... 65/25.2, 104, 107, 65/114, 157, 169, 182.2, 348, 349, 351, 25.4, 95

(56) References Cited

U.S. PATENT DOCUMENTS

| | | |
|---|---|---|
| 2,144,320 A | 1/1939 | Bailey |
| 3,245,772 A | 4/1966 | Cypher et al. |
| 3,351,450 A | 11/1967 | Silverwood |
| 3,351,451 A | 11/1967 | Barradell-Smith et al. |
| 3,372,016 A | 3/1968 | Rahrig et al. |
| 3,497,340 A | 2/1970 | Dennison et al. |
| 3,526,490 A | 9/1970 | Misson |
| 3,600,151 A | 8/1971 | Cypher et al. |
| 3,672,861 A | 6/1972 | Ritter, Jr. et al. |
| 3,806,331 A | 4/1974 | Bezombes |
| 3,881,907 A | 5/1975 | Starr |
| 4,781,747 A | 11/1988 | Soedervall |
| 4,886,540 A | 12/1989 | Nitschke |
| 5,149,352 A | 9/1992 | Yoshizawa et al. |
| 6,079,227 A * | 6/2000 | Yoshizawa et al. ........ 65/182.2 |

FOREIGN PATENT DOCUMENTS

| | | |
|---|---|---|
| DE | 14 21 784 A | 10/1968 |
| DE | 14 71 880 A | 3/1969 |
| DE | 14 71 944 A | 3/1969 |
| EP | 0 425 998 A | 5/1991 |
| JP | 44-14832 | 7/1969 |
| JP | 48-5242 | 2/1973 |
| JP | 4-41152 | 9/1992 |
| JP | 7-237928 | 9/1995 |

* cited by examiner

*Primary Examiner*—James Derrington
(74) *Attorney, Agent, or Firm*—Merchant & Gould PC

(57) ABSTRACT

A gas is supplied to the surface of the glass sheet transferred between a heating furnace and a cooling apparatus for tempering the glass sheet. The gas is supplied from the upstream side with respect to the direction of transfer of the glass sheet by an air curtain device. This gas runs along the glass sheet surface (upper surface) downstream with respect to the direction of transfer to obstruct the flow of cooling gas from the cooling apparatus in the upstream direction. The gas prevents cooling air from the cooling apparatus from invading the heating furnace so that the difference of the curvature of the glass sheet on the front and rear part can be eliminated.

6 Claims, 6 Drawing Sheets

METHOD FOR MANUFACTURING TEMPERED GLASS SHEET AND APPARATUS FOR MANUFACTURING THE SAME

This application is a Divisional of application Ser. No. 09/089,470, filed Jun. 2, 1998, now U. S. Pat. No. 6,032,489 which application(s) are incorporated herein by reference.

FIELD OF THE INVENTION

This invention relates to a method for manufacturing a tempered glass sheet and an apparatus thereof more particularly, this invention relates to a method and an apparatus for manufacturing a tempered glass sheet useful for architecture, automobiles or the like.

BACKGROUND OF THE INVENTION

As the window glass sheet for architecture or automobile, a tempered glass sheet is extensively used as a safety glass sheet. As a method for manufacturing a tempered glass sheet, there is extensively practiced an air-cooling method of quickly cooling the glass sheet that has been heated to a temperature near the softening point to form a compressive stress layer in the surface of the glass sheet.

In view of the design and aerodynamic characteristics of automobiles, there are great demands for curved window glass sheets. Accordingly, in the air-cooling method the heated glass sheet is often formed into a curved shape before the glass sheet is cooled to temper. The method for bending a glass sheet includes a method of pressing a glass sheet suspended by a tong (a glass-suspender) with a pair of convex and concave press molds, and a method of pressing a glass sheet that has been transferred horizontally from a heating furnace with a pair of upper and lower press molds.

In the bending methods involving pressing with molds, the step of heating a glass sheet and the step of bending the glass sheet are basically taken as independent steps. However, there is proposed a method to practice the two steps as a single step. In such a method the glass sheet transferring means such as rolls or beds are provided in the heating furnace with a predetermined curvature, so that the heated glass sheet is gradually bent down by its own weight until it constitutes a curved surface having the curvature. The bent glass transferred to the cooling apparatus adjacent to the heating furnace is cooled into a tempered glass sheet. This method is excellent in the point that there is no necessity to press the glass sheet individually. In order to make use of this feature, various improvements on the method have been made for practical applications (e.g., Japanese Examined Patent Publications Nos. S44-14832/1969, S48-5242/1973, and Japanese Unexamined Patent Publication No. H7-237928/1995).

However, the tempered glass sheet by the method tends to be formed into a shape different from what originally was expected. Typically, as shown in FIG. 5A, when a flat tempered glass sheet is expected, the rear end part of the glass sheet in the direction of transfer becomes convex, and as shown in FIG. 5B, when a curved glass sheet that should show a convex upward shape was expected, the rear end part shows a larger curvature than the front end part in the direction of transfer.

Such a difference of curvature is caused mainly by the fact that the cooling air blown to the glass sheet in the cooling apparatus goes into the heating furnace. In other words, as shown in FIG. 6, when the glass sheet is transferred to the cooling apparatus, the cooling air blown to the upper surface of the front end part in the direction of transfer of the glass sheet runs along the surface of the glass sheet to the upstream side of transfer to go into the heating furnace. The cooling air lowers the temperature on the upper surface at the rear end part of the glass sheet before it reaches the cooling apparatus. On the other hand, the lowering of the temperature on the upper surface at the front end part of the glass sheet is not so remarkable as at the rear end part of the glass sheet, because the intrusion of the cooling air into the heating furnace becomes remarkable by the flow along the surface of the glass sheet, as shown in FIG. 6.

As a result, at the rear end part of the glass sheet in the direction of transfer, the temperature variation range in cooling becomes greatly different between the upper and the lower surfaces of the glass sheet and the shrinkage amounts by cooling also show differences. Thus, there has been a phenomenon that the curvatures of the glass sheet become different between the front end part and the rear end part in the direction of transfer.

In view of the above problem, in Japanese Utility Model Publication No. H4-41152/1992, there is proposed to dispose a heating device between the heating furnace and the cooling apparatus. According to the heating device, the inconvenience as referred to above can be alleviated by compensating the temperature difference on the surface of the glass sheet prior to it being transferred into the cooling apparatus. However, the method using the heating device necessitates heating a specified part of the glass sheet in the course of transferring it, so that the operation is not necessarily easy, and involves a problem to be overcome.

SUMMARY OF THE INVENTION

An object of the present invention is, in the light of the situation as described above, to provide a method and an apparatus for manufacturing a tempered glass sheet which can suppress simply and assuredly the difference of the curvatures of the glass sheet that result between the front end part and the rear end part in the direction of transport.

According to the present invention, there is provided a method for manufacturing a tempered glass sheet, which comprises heating a glass sheet in a heating furnace, transferring the glass sheet from the heating furnace to a cooling apparatus adjacent to the heating furnace, cooling the glass sheet in the cooling apparatus with a cooling air so as to temper the glass sheet, and supplying a gas onto the surface of the glass sheet transferred from the heating furnace to the cooling apparatus so that the gas runs along the surface in the downstream direction of transferring the glass sheet.

According to the present invention, there is provided another method for manufacturing a tempered glass sheet, which comprises heating a glass sheet in a heating furnace, transferring the glass sheet from the heating furnace to a cooling apparatus adjacent to the heating furnace, cooling the glass sheet in the cooling apparatus with a cooling air so as to temper the glass sheet, and supplying a gas onto the surface of the glass sheet from the upstream side of transferring the glass sheet further than the surface so as to suppress intrusion of the cooling air into the heating furnace.

According to the above methods, it is possible to suppress effectively the difference of the shape between the front end part and the rear end part in the direction of transfer of the glass sheet. This is because the cooling air from the cooling apparatus that tends to invade the heating furnace along the surface of the glass sheet is prevented from running in the direction of the heating furnace by the gas which is supplied to the surface of the glass sheet.

The above method can be carried out by an apparatus for manufacturing a tempered glass sheet, which comprises a heating furnace for heating a glass sheet having a transfer outlet for the glass sheet, a cooling apparatus for cooling the glass sheet with a cooling air so as to temper the glass sheet and having a transfer inlet disposed to be adjacent to the transfer outlet of the heating furnace, caring means for transferring the glass sheet from the heating furnace to the cooling apparatus through the transfer outlet and the transfer inlet, and gas blowing means positioned upstream of the cooling apparatus and arranged so as to blow a gas onto a surface of the glass sheet located at a position downstream of the position of the gas blowing means.

According to the apparatus for manufacturing a tempered glass sheet, it is possible to suppress effectively the difference of the curvatures between the front end part and the rear end part in the direction of transfer of the glass sheet and produce a tempered glass having a reduced difference from the expected configuration. This is because the cooling air from the cooling apparatus that tends to invade the heating furnace along the surface of the glass sheet is prevented from running in the direction of the heating furnace by the gas supplied to the surface of the glass sheet. Furthermore, according to this production apparatus, a partial difference of curvatures of the sheet glass can be suppressed simply and assuredly without requiring a large remodeling for the conventional apparatus already in use.

DETAILED DESCRIPTION OF THE PREFERRED EMBODIMENT

In the method for manufacturing a tempered glass sheet as described above, a gas may be supplied from the position in between the heating furnace and the cooling apparatus, but it is preferable for the gas to be supplied from the inside of the heating furnace. Also, irrespective of the position of supplying the gas, it is preferable to supply a gas heated in the heating furnace. According to these preferred embodiments, the high temperature gas in the heating furnace is to be supplied to the glass sheet surface, and, when compared, for example, with the case of supplying a gas at about room temperature, it is possible to suppress the lowering of the temperature on the upper surface of the glass sheet before being carried to the cooling apparatus, and it becomes possible to alleviate the temperature difference per se on the upper and lower surfaces of the tempered glass sheet, and to improve the precision of forming the tempered glass sheet.

Furthermore, in the above method for manufacturing the tempered glass sheet, a gas may be supplied to the glass sheet surface at a position in the vicinity of the heating furnace transfer outlet or in between the heating furnace and the cooling apparatus. It is preferable to supply a gas to the neighborhood of the position of the upstream end of the area in which the cooling air is supplied to the glass sheet. The position on which the gas is supplied is more preferably approximately the same position as that stated in the above. According to these preferred examples, the time during which the supplied gas is in contact with the glass surface is lessened, and the temperature decrease on the upper surface of the glass sheet prior to the cooling process can be suppressed, so that, in the same manner as described above, the forming precision of the tempered glass sheet can be improved.

Furthermore, in the method for manufacturing the tempered glass sheet as described above, it is preferable to subject the glass sheet to bend forming in the heating furnace. It is because the present invention method is particularly effective for improving the precision of shape of the bend tempered glass. This bend forming is preferably that made by utilizing the deformation of the heated glass sheet by own weight.

Hereinafter, preferred embodiments of the present invention are described with reference to the drawings.

(First embodiment)

Figure 1:
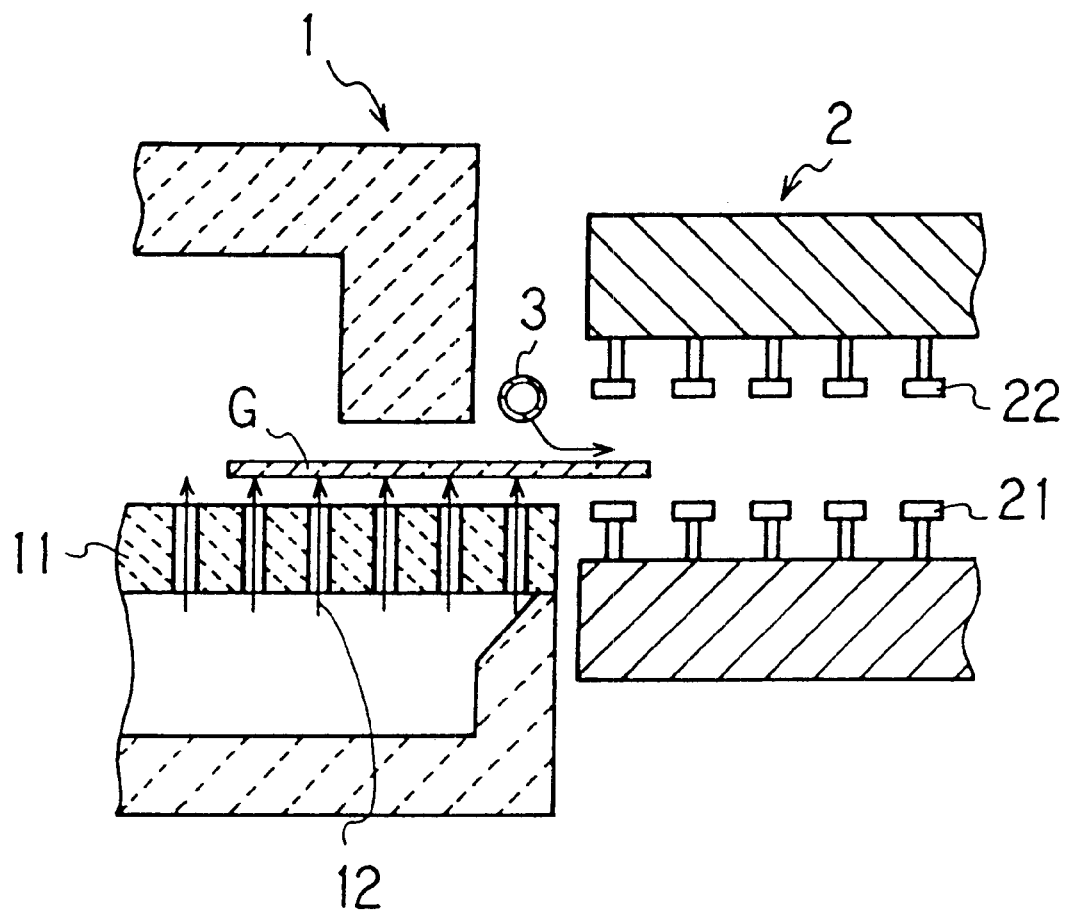
FIG. 1 is a sectional view showing an embodiment of the production equipment of the present invention.

FIG. 1 is a sectional view showing an example of the glass sheet tempering apparatus of the present invention. In the heating furnace 1, there is provided an air table 11 as the means for transferring a glass sheet. This air table 11 has a large number of nozzle holes, so that the heated air blown out from the nozzle holes jets out to the lower surface of the glass sheet to support the glass sheet for transfer. This hot air 12 takes part in transferring the glass sheet while floating and in heating the glass sheet to soften it. The glass sheet to be bend-formed is heated to a temperature range in the vicinity of the softening point (preferably at more than the stress point and lower than the softening point) to have a certain curvature along the surface configuration of the air table under dead weight.

The air table typically has a curvature in a direction perpendicular to the direction of transfer of the glass sheet and is shaped to be convex upward, but it may have a shape to be convex downward, and the desired tempered glass may be a flat sheet form if the objective tempered glass is a flat sheet. Alternatively, a roll or the like may be used in place of the air table 11, as the means for transferring the glass sheet.

The transfer outlet of the heating furnace is preferably slightly larger than the thickness of the glass sheet, in consideration of the heating efficiency and entry of external air into the heating furnace. In practice, it is required to secure a space to a degree that the contact of the heated glass sheet can be prevented. The space defined by the transfer outlet is divided into the upper and lower spaces by the glass sheet while it passes through the outlet. Of these spaces, what provides the problem in the entry of the cooling air is a space on the upper part of the glass sheet. The space underneath the glass sheet is narrow under the effect of the dead weight of the glass sheet, and in addition, as the air which blows out from the air table plays the role of the air curtain, the entry of the cooling air is substantially of no problem.

Inside the cooling apparatus 2 installed on the downstream side of transfer adjacent to the heating furnace 1, there are disposed a plurality of quench modules 21, 22 directed towards the glass sheet transfer route from upper and lower positions. By the air (typically, cooling air) supplied from these quench modules 21, 22, the glass sheet is quenched and tempered while being transferred. The quench modules 21, 22 are not limited to be of the configurations shown in FIG. 1 but may be tubular or the like.

From the viewpoint of improving the glass sheet strength, the heating furnace 1 and the cooling apparatus 2 are preferably disposed nearby each other.

Figure 2:
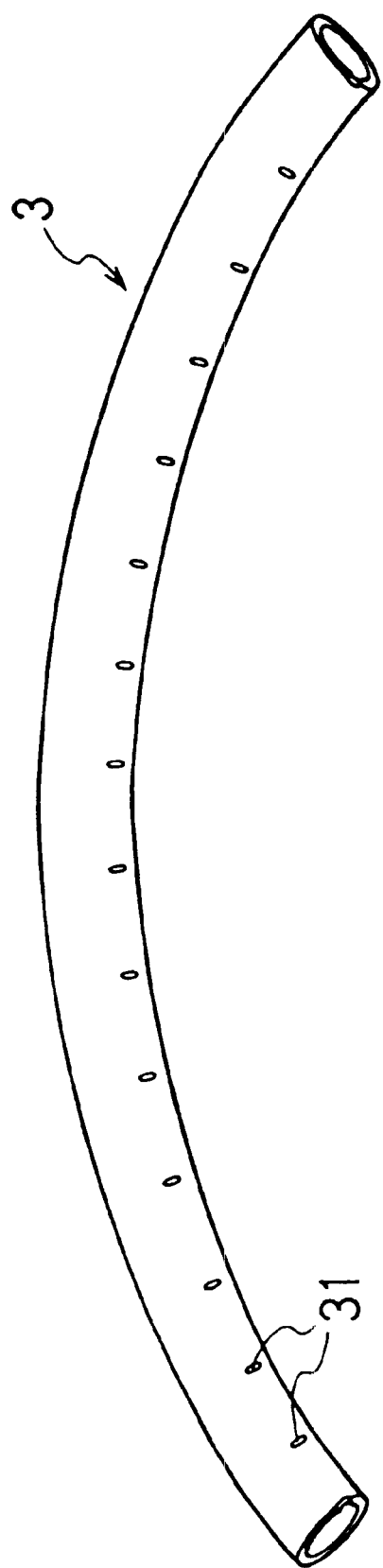
FIG. 2 is a view showing an embodiment of the air curtain device to be used for the production equipment of the present invention.

Above the glass sheet transfer route between the heating furnace and the cooling apparatus 2, there is installed an air curtain device 3. This air curtain device 3 is, as shown in FIG. 2, preferably a hollow pipe having a plurality of nozzle holes 31 arranged in a row in the lengthwise direction (the widthwise direction with respect to the glass sheet). Of course, the gas discharge port of the air curtain device 3 need not necessarily be plural nozzle holes independent from one another but may be a slit which extends in the lengthwise direction. The air curtain device 3 may have a circular or elliptical cross section as shown in FIG. 2, but without specially limitation, and the section may be other shapes such as rectangular.

Each nozzle hole 31 is disposed so that the gas can be discharged obliquely downward in a downstream direction with respect to the transfer of the glass sheet. Each nozzle hole 31 is preferably disposed to jet out a gas in the direction inclined obliquely downward in the downstream direction with an inclination in the range of 30 to 60 degrees from vertical. According to this preferred embodiment, the gas running downstream on the glass sheet surface in the direction of transfer of the glass sheet can be supplied in a stabilized state.

Furthermore, as shown in FIG. 2, if the glass sheet is bend-formed in a heating furnace, it is preferable for the air curtain device 3 to have a corresponding configuration, preferably for example an upwardly curved convex shape as shown in FIG. 2.

The position for setting the air curtain device 3 is preferably at a height of 10 mm–120 mm from the upper surface of the glass sheet. According to this preferred embodiment, there is no apprehension for the air curtain device 3 to come into contact with the softened glass sheet, and yet the intrusion of the cooling air into the heating furnace from the cooling apparatus can be effectively suppressed.

The hole diameter of the nozzle holes 31 of the air curtain device 3 is preferably 1.0–2.0 mm, and the pitch of the nozzle holes is preferably 10 mm–20 mm. According to these preferred examples, entry of the cooling air blown at high pressure can be securely prevented by the "air curtain" formed by the gas jetting out from the nozzle holes.

Next, an example of the method for manufacturing the tempered glass sheet using this apparatus is explained.

The glass sheet which is heated in the heating furnace 1 and bend-formed by utilizing the dead weight of the glass sheet is passed through the glass transfer outlet of the heating furnace 1 and transferred to the cooling apparatus. When the front end part of the transferred glass sheet approaches the cooling apparatus 2 and cooling air from the cooling modules 21, 22 comes to be blown onto the surface of the front end part, the cooling air tends to run upstream with respect to the direction of transfer along the upper surface of the glass sheet. However, as the gas from the air curtain device 3 has already been supplied to the upper surface of the glass sheet and said gas has run to the downstream with respect to the transfer direction along the upper surface of the glass sheet, the flow of the cooling air to the upstream side is obstructed, and the intrusion of the cooling air into the inside of the heating furnace is suppressed.

Ordinarily, in order to improve productivity, a plurality of glass sheets are continuously supplied to the tempering apparatus, and the respective sheet is bend-formed according to necessity, and transferred from the heating furnace 1 to the cooling apparatus 2, in which it is quenched to be tempered. In order to meet the glass sheet which comes to be continuously transferred, cooling air is continuously supplied in the cooling apparatus 2. Accordingly, it is desirable for the gas from the air curtain device 3 to be continuously supplied.

Moreover, in order to suppress effectively the intrusion of the outside gas into the heating furnace, the discharge pressure of the gas supplied from the air curtain device 3 can be 0.02 kg/cm²–3 kg/cm². This is because, when the discharge pressure is too low, it becomes difficult to obstruct intrusion of cooling air, and when it is too high, there is an apprehension that the stabilized transfer of the glass sheet could be compromised. Especially, when the discharge pressure is increased, there is a likelihood for the discharge gas from the air curtain device 3 to cause springing up of the rear end of the glass sheet after passage of the glass sheet to hamper the stabilized transfer of the glass sheet. Therefore, when importance is attached to such a point, the discharge pressure of the gas is more preferably no more than 2 kgf/cm².

(Second embodiment)

Figure 3:
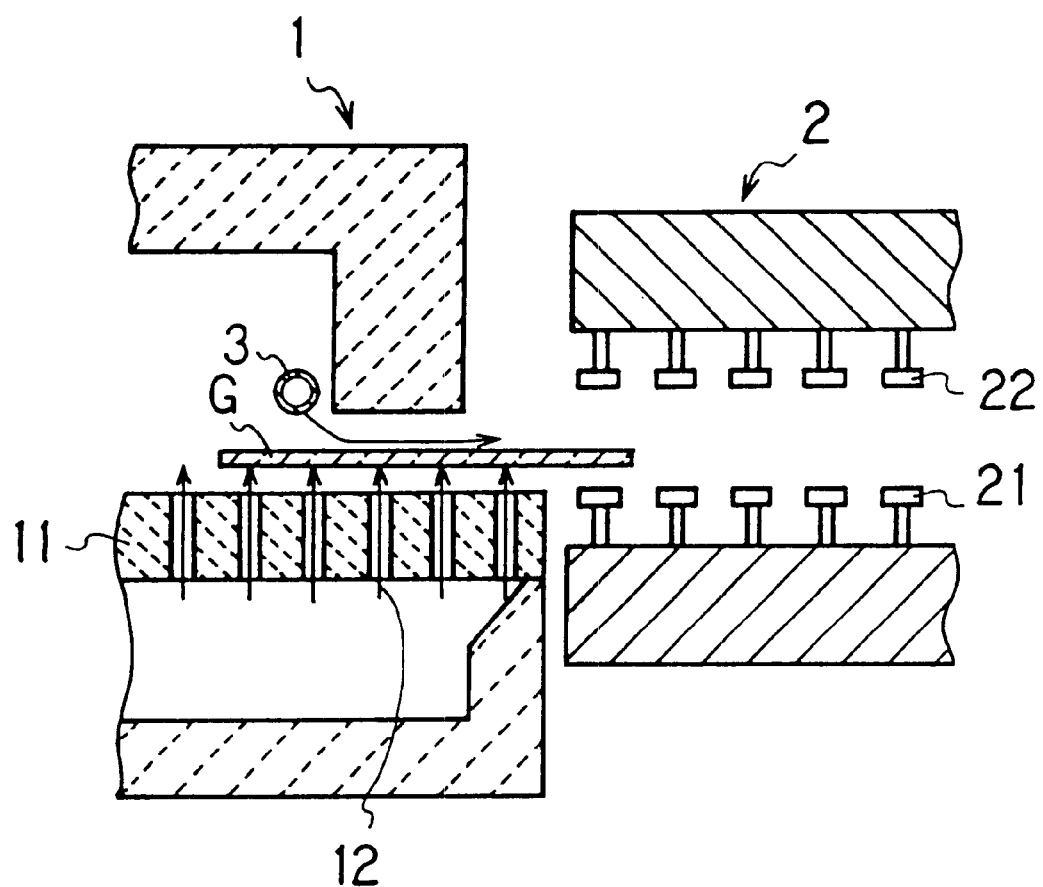
FIG. 3 is a sectional view showing another embodiment of the production equipment of the present invention.

FIG. 3 is a sectional view showing another embodiment of the glass sheet tempering apparatus of the present invention. This apparatus is common with the apparatus shown in FIG. 1 with respect to the basic constitution of the heating furnace 1 and the cooling device 2, but is different in the point that an air curtain device 3 is disposed inside the heating furnace 1.

According to the apparatus shown in FIG. 3, the gas blown out from the air curtain device 3 is to be supplied to the upper surface of the glass sheet while involving the high temperature gas in the heating furnace. Accordingly, when a gas is supplied from the air curtain device 3 by the apparatus shown in FIG. 3, intrusion of the cooling air into the heating furnace is suppressed in the same manner as in the first embodiment, and the lowering of temperature on the upper surface of the glass sheet by the supplied gas is more suppressed and the temperature difference between the upper and the lower surfaces of the glass sheet becomes smaller than in the case of the first embodiment.

Since the temperature difference between the upper and the lower surfaces of the glass sheet to be transferred into the cooling apparatus gives differences in shrinkage rate between the upper and the lower surfaces, the second embodiment is more preferable from the viewpoint of forming the glass sheet to a predetermined shape (shape formed in the heating furnace).

The embodiment for supplying a heated gas in the heating furnace is not limited to the embodiment shown in FIG. 3 but may be to supply a gas through the vent pipe or the like from the heating furnace to the curtain device as shown in FIG. 1 for example.

(Third embodiment)

Figure 4:
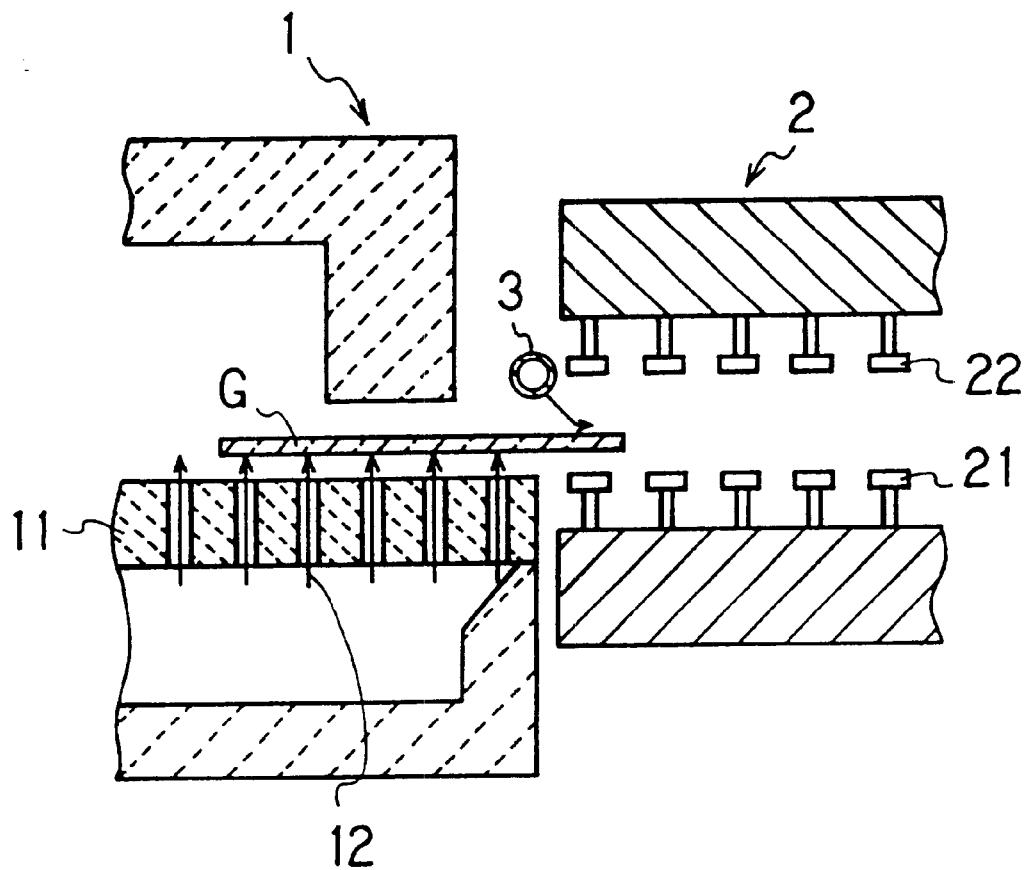
FIG. 4 is a sectional view showing a still further embodiment of the production equipment of the present invention.
Figure 5A:
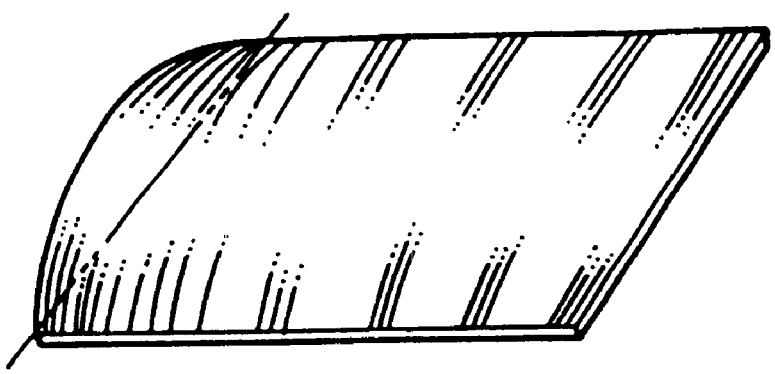
FIG. 5A is a perspective view showing a glass sheet that has different curvatures on the front and rear part in the direction of transfer.
Figure 5B:
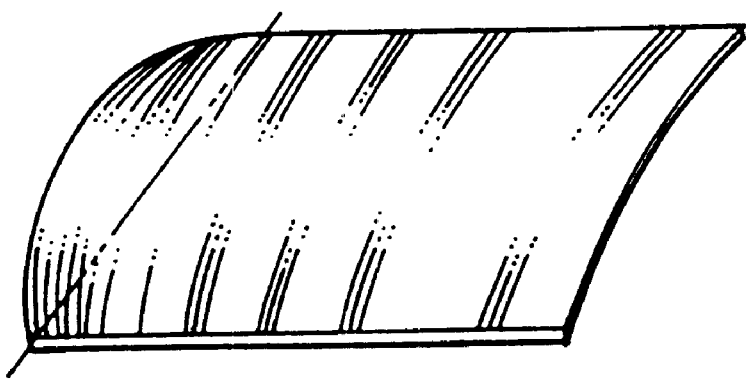
FIG. 5B is a perspective view showing another glass sheet that has the different curvatures.
Figure 6:
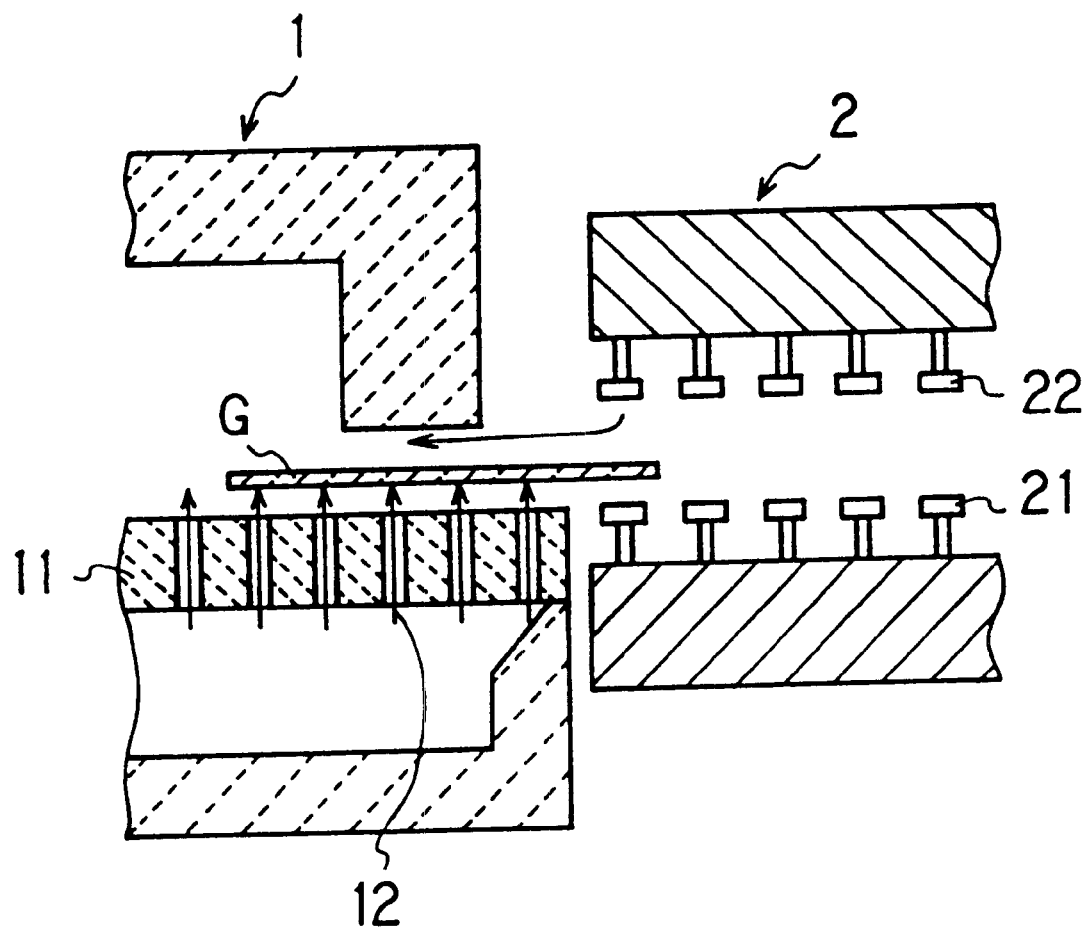
FIG. 6 is a sectional view showing an embodiment of the production apparatus for the bent and tempered glass sheet in conventional use.

FIG. 4 is a sectional view showing another embodiment of the glass sheet tempering apparatus of the present invention. This apparatus is common with the apparatus shown in FIG. 1 with respect to the basic constitution of the heating furnace 1 and the cooling device 2, but is different in the point that an air curtain device 3 is disposed in the vicinity of the cooling apparatus.

According to the apparatus shown in FIG. 4, the gas blown out obliquely downward from the air curtain device 3 comes into contact with the upper surface of the glass sheet at approximately the same position as or slightly upstream of the cooling air blown out in an approximately vertical direction from the cooling module disposed furthest upstream in the cooling apparatus. This gas suppresses intrusion of the cooling air into the heating furnace in the same manner as in the first embodiment.

On the other hand, because the time during which the gas supplied from the air curtain is in contact with the glass sheet is extremely short, the temperature on the surface of the glass sheet to be transferred to the cooling apparatus does not become lower than the case shown in the first embodiment, and it is possible to improve the molding precision of the glass sheet in the same manner as in the second embodiment.

In the second and third embodiments, basically it is preferable to adopt the gas discharge pressure, installation position of the air curtain device, and size and arrangement of the nozzle hole as described in the first embodiment.

When the air curtain device is fitted to both of the positions shown in FIG. 3 and in FIG. 4 so as to supply a gas to the surface of the glass sheet from both air curtains, the forming precision of the glass sheet can be improved to a degree that is entirely of no problem.

Further, in practicing the present invention method, as described above, ordinarily, during the transfer of a sheet of glass sheet from the heating furnace to the cooling apparatus, a gas is incessantly supplied to the glass sheet surface from the air curtain device. Alternatively, the gas may be jetted only to a predetermined portion in the glass by opening or closing the solenoid valve provided on the intermediate part of the piping for supply of gas to the air curtain device.

According to this method, by positively utilizing the surface temperature decrease of the glass sheet by intrusion of the cooling air into the heating furnace or by blowing of gas, it becomes possible to give the intended curvature to the glass sheet in the transfer direction.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method for manufacturing a tempered glass sheet, comprising:

transferring a glass sheet heated in a heating furnace from the heating furnace to a cooling apparatus adjacent to the heating furnace;

supporting the glass sheet during said transferring by supplying a first gas to a lower surface of the glass sheet, wherein the first gas is heated; and cooling the glass sheet in the cooling apparatus with a cooling air so as to temper the glass sheet;

wherein a second gas is supplied from inside the heating furnace onto an upper surface of the glass sheet from upstream of the upper surface with respect to the direction of transferring the glass sheet so as to suppress intrusion of the cooling air into the heating furnace while supporting the glass sheet by supplying the first gas.

2. A method for manufacturing a tempered glass sheet according to claim 1, wherein the second gas is supplied to the glass sheet surface at a position between the heating furnace and the cooling apparatus in a vicinity of a position furthest upstream of a region in which the cooling air is blown onto the glass sheet.

3. A method for manufacturing a tempered glass sheet according to claim 1, wherein the glass sheet is formed into a curved shape in the heating furnace due to the self-weight of the glass sheet.

4. A method for manufacturing a tempered glass sheet according to claim 1, further comprising a step of heating the glass sheet nearly to a softening point of the glass sheet in the heating furnace.

5. An apparatus for manufacturing a tempered glass sheet, comprising:

a heating furnace for heating a glass sheet, the heating furnace having a transfer outlet for the glass sheet;

a cooling apparatus for cooling the glass sheet with a cooling air so as to temper the glass sheet, the cooling apparatus having a transfer inlet disposed to be adjacent to the transfer outlet of the heating furnace;

a carrying means for transferring the glass sheet from the heating furnace to the cooling apparatus through the transfer outlet and the transfer inlet, the carrying means supporting the glass sheet by supplying a heated gas to a lower surface of the glass sheet; and a gas blowing means positioned in the heating furnace for blowing a gas onto an upper surface of the glass sheet in a downstream direction with respect to the transferring of the glass sheet so as to suppress intrusion of the cooling air into the heating furnace while supporting the glass sheet by the carrying means.

6. An apparatus for manufacturing a tempered glass sheet according to claim 5, wherein the carrying means has a curved surface.

* * * * *